3,748,289
CARBODIIMIDE FOAMS OF REDUCED FRIABIL-
ITY PREPARED IN THE PRESENCE OF AN
ACRYLONITRILE-GRAFTED POLYOL
Moses Cenker, Trenton, Peter T. Kan, Livonia, John T.
 Patton, Jr., Wyandotte, and Earl J. Robertson, Trenton,
 Mich., assignors to BASF Wyandotte Corporation,
 Wyandotte, Mich.
No Drawing. Filed Oct. 1, 1971, Ser. No. 185,910
Int. Cl. C08g 22/46, 22/08
U.S. Cl. 260—2.5 BF      6 Claims

ABSTRACT OF THE DISCLOSURE

Rigid cellular foams characterized by carbodiimide linkages and of reduced friability are prepared by the catalytic condensation of an organic polyisocyanate and in the presence of an acrylonitrile-grafted polyol.

BACKGROUND OF THE INVENTION

(1) Field of the invention

The present invention pertains to rigid cellular foam compositions characterized by carbodiimide linkages and in particular foams of this nature having reduced friability. Even more particularly, the present invention concerns rigid foams characterized by carbodiimide linkages prepared from organic polyisocyanates and in the presence of an acrylonitrile-grafted polyol to reduce the friability thereof without deleteriously affecting the flame retardancy.

(2) Prior art

In copending U.S. patent application Ser. No. 5,985, filed Jan. 26, 1970, now U.S. Pat. No. 3,645,923; Ser. No. 157,025, filed June 25, 1971; Ser. No. 118,994, filed Feb. 25, 1971, and Ser. No. 169,470, filed Aug. 5, 1971; now U.S. Pat. No. 3,717,596, there are disclosed processes for the preparation of rigid cellular foams characterized by carbodiimide linkages. Moreover, these copending applications disclose the use of various compounds, such as active hydrogen-containing compounds, plasticizers, surfactants, and the like, to enhance the physical properties of the resulting foams. However, among the major problems still to be resolved with these foam products is adequate reduction of the friability.

Although active-hydrogen containing compounds can be used to reduce the friability of the foams, it has been found that such compounds reduce the flame retardancy of the foams, thus, negating the utility of these compounds. Hence, the present invention seeks to provide compositions which can be incorporated into the foams thereof without deleteriously affecting the flame retardancy and concomitantly, effectively, reducing the friability of the foams.

SUMMARY OF THE INVENTION

In accordance with the present invention, it has now been found that when an acrylonitrile-grafted polyol is used in the preparation of a carbodiimide foam of the type herein contemplated, the friability of the resulting foam is reduced without any deleterious effect upon the flame retardancy of the foams.

Generally, from about 1 to 20 parts by weight of acrylonitrile-grafted polyol per 100 parts by weight of organic polyisocyanate are used in the preparation of the foams.

For a more comprehensive discussion of the present invention, reference is made to the following detailed description and examples thereof.

DESCRIPTION OF THE PREFERRED EMBODIMENT

In accordance with the present invention rigid cellular foams characterized by carbodiimide linkages or carbodiimide foams are prepared by the catalytic condensation of an organic polyisocyanate in the presence of a friability-reducing amount of an acrylonitrile-grafted polyol.

The preparation of carbodiimide foams has previously been described in the above-identified copending U.S. patent applications, the disclosures of which are hereby incorporated by reference.

Generally, these foams are prepared by condensing an organic polyisocyanate in the presence of either (1), 2,4,6-tris(dialkanolamino)-s-triazine, or (2) 2,4,6-tris(N-methylethanolamino)-s-triazine, or (3) a co-catalyst system consisting of either the 2,4,6-tris(dialkanolamino)-s-triazine or the 2,4,6 - tris(N-methylethanolamino)-s-triazine in conjoint use with an isocyanatetrimerization compound selected from the group consisting of 1,3,5-tris(N,N-dialkylaminoalkyl)-s-hexahydrotriazine; 2,4,6 - tris(dimethylaminomethyl)phenol; o-, p- or a mixture of o- and p-dimethylaminomethylphenol; or an organotin compound. Further, these foams, as taught in the referred to copending applications, contemplate the addition thereto of active-hydrogen containing compounds to enhance the properties thereof, as well as plasticizers, surfactants, and the like.

The foams are generally prepared by reacting the organic polyisocyanate in the presence of a catalytically sufficient amount of either one of the principal catalysts, alone, or in the presence of a co-catalyst system and at a temperature ranging from about room temperature to about 100° C.

The carbodiimide foams produced by the processes of the copending applications are rigid cellular plastics which possess excellent flame retardency, excellent weight retention and low smoke evolution.

The present invention contemplates modifying the processes of the copending applications which comprise condensing an organic polyisocyanate in the presence of any one of the catalytic systems above-defined by preparing the foams in the presence of a friability-reducing amount of an acrylonitrile-grafted polyol. In addition to the fraability reduction of the foams, it has been found that the use of these polyols does not impair the flame retardancy of the foams as do the heretofore disclosed active-hydrogen containing compounds.

The use of an acrylonitrile-grafted polyol to reduce the friability of isocyanurate foams without impairing flame retardancy has heretofore been described by S. R. Riccitiello et al., Journal of Cellular Plastics, March/April 1971, pp. 91–96. However, the present foams are distinct from isocyanurate foams by virtue of the carbodiimide content of the present foams.

Generally, the acrylonitrile-grafted polyol contemplated for use herein comprises the in situ polymerization product of acrylonitrile monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The acrylonitrile graft polyol has a molecular weight of at least about 1500 and a viscosity of less than 40,000 cps. at 10% polymer concentration.

A more comprehensive discussion of the acrylonitrile-grafted polyol contemplated for use herein and its method of preparation can be found in U.S. Pat. Nos. 3,383,351 and 3,304,273, the disclosures of which are hereby incorporated by reference.

Other useful acrylonitrile-grafted polyols are found in copending Ser. No. 878,594, filed Nov. 20, 1969, now U.S. Pat. No. 3,652,639.

Among the useful graft polyols contemplated for use, herein, particularly preferred, is one prepared by the in situ polymerization of acrylonitrile in a reactive polyol medium comprising the propylene oxide adduct of glycerine. The resulting product containing from about 17% to 18% by weight of acrylonitrile and having a molecular weight of about 3700, an OH number of from 43.0 to 47.0 and a flash point of 390° F. This product is sold commercially by Union Carbide under the name NIAX® Polyol 31–45.

The graft polyol is employed herein in an amount ranging from about 1 to 20 parts by weight thereof per 100 parts by weight of organic polyisocyanate. Preferably, from about 2 to 15 parts by weight of acrylonitrile-grafted polyol per 100 parts by weight of organic polyisocyanate.

The graft polyol can be introduced into the system in any convenient manner. One simple mode of introduction is to add the graft polyol simultaneously with the catalyst to the isocyanate. Alternatively, the graft polyol can be preblended with the catalyst to form a homogeneous mix which is then added to the isocyanate. A third method which can be used comprises reacting the isocyanate with the graft polyol to form a quasi-prepolymer which can then be condensed to form a carbodiimide foam in the presence of the catalyst.

As disclosed in the above-referred to copending applications, in preparing the carbodiimide foams, surfactants, plasticizers and the like can be used. These ingredients are, generally, preblended with the catalyst to facilitate their introduction into the reaction system.

Also, as disclosed in copending U.S. patent application Ser. No. 169,526, filed Aug. 5, 1971, the disclosure of which is hereby incorporated by reference, a supplemental blowing agent can be included in the reaction system for increasing the closed cell content of the foams.

For a more complete understanding of the present invention, reference may be made to the following non-limiting examples. In the examples, all parts are by weight, absent any indication to the contrary.

EXAMPLES 1-18

These examples illustrate the preparation of carbodiimide foams of reduced friability in accordance with the present invention.

The foams herein were prepared at room temperature by placing a quantity of a mixture of organic polyisocyanate and fluorocarbon blowing agent into a suitable vessel. Then, with stirring, separate streams of catalyst and acrylonitrile-grafted polyol were added simultaneously to the isocyanate. The resulting mixture was then stirred for a few seconds whereupon an exotherm was generated and a foam developed in the vessel.

The catalyst employed herein was a co-catalyst system of 2,4,6-tris(N-methylethanolamino)-s-triazine and a 1,3,5-tris(N,N - dialkylaminoalkyl)-s-hexahydrotriazine, and specifically, 1,3,5-tris(N,N-dimethyl - 3 - aminopropyl)-s-hexahydrotriazine, the co-catalyst system being more particularly defined in the above-referred to application, U.S. Ser. No. 169,470.

Where plasticizers, surfactants and the like were utilized, they were preblended with the co-catalyst system to facilitate their introduction into the reaction environment.

Table I, below, sets forth the ingredients used to prepare the foams, as well as friability measurements. The friability of the foams were measured with a Taber Abraser, the results of which correlated with ASTM C367 and C421. (See "Friability Tests for Rigid Cellular Plastics," by C. J. Hilado, J. Cell. Plastics, p. 56, January 1969.)

TABLE I

| Ex: | Isocyanate | | Catalyst | | Plasticizer [5] | Acrylonitrile | | | Density, PCF | Taber friability cycles, inches |
|---|---|---|---|---|---|---|---|---|---|---|
| | TDI [1] | MDI [2] | TMT [3] | TDH [4] | | Surfactant [6] | Graft polyol [7] | Blowing agent [8] | | |
| 1 | 10 | 90 | 1.8 | 0.9 | 1.2 | 0.6 | 0 | 10 | 3.39 | 204 |
| 2 | 10 | 90 | 1.8 | 0.9 | 1.2 | 0.6 | 2 | 10 | 3.54 | 250 |
| 3 | 10 | 90 | 1.8 | 0.9 | 1.2 | 0.6 | 4 | 10 | 3.53 | 276 |
| 4 | 10 | 90 | 1.8 | 0.9 | 1.2 | 0.6 | 8 | 10 | 3.89 | 307 |
| 5 | 10 | 90 | 1.8 | 0.9 | 1.2 | 0.6 | 10 | 10 | 3.53 | 374 |
| 6 | 20 | 80 | 2.6 | 1.3 | 1.73 | 0.87 | 15 | 15 | 2.75 | 227 |
| 7 | 10 | 90 | 2.6 | 1.3 | 1.73 | 0.87 | 15 | 15 | 3.19 | 316 |
| 8 | | 100 | 3.2 | 1.6 | 2.13 | 1.07 | 15 | 15 | 3.59 | 378 |
| 9 | 20 | 80 | 1.8 | 0.9 | 1.2 | 0.6 | 0 | 15 | 2.25 | 106 |
| 10 | 20 | 80 | 1.8 | 0.9 | 1.2 | 0.6 | 2 | 15 | 2.32 | 169 |
| 11 | 20 | 80 | 1.8 | 0.9 | 1.2 | 0.6 | 5 | 15 | 2.44 | 190 |
| 12 | 20 | 80 | 1.8 | 0.9 | 1.2 | 0.6 | 10 | 15 | 2.55 | 216 |
| 13 | 20 | 80 | 2.6 | 1.3 | 1.73 | 0.87 | 15 | 15 | 2.69 | 262 |
| 14 | 10 | 90 | 1.8 | 0.9 | 1.2 | 0.6 | 0 | 15 | 2.43 | 125 |
| 15 | 10 | 90 | 1.8 | 0.9 | 1.2 | 0.6 | 10 | 15 | 2.94 | 163 |
| 16 | 10 | 90 | 2.6 | 1.3 | 1.73 | 0.87 | 15 | 15 | 3.12 | 200 |
| 17 | | 100 | 2.6 | 1.3 | 1.73 | 0.87 | 0 | 15 | 2.76 | 282 |
| 18 | | 100 | 2.6 | 1.3 | 1.73 | 0.87 | 15 | 15 | 3.25 | 380 |

[1] An 80:20 weight mixture of 2,4- and 2,6-toluene diisocyanate; [2] Crude methylene diphenyldiisocyanate; [3] 2,4,6-tris(N-methylethanolamino)-s-triazine; [4] 1,3,5-tris(N-dimethyl-3-aminopropyl)-s-hexahydrotriazine; [5] Tris(2-chloroethyl) phosphate; [6] A polysiloxane surfactant sold by Dow Chemical under the name DC-193; [7] Examples 1-8 prepared using a graft polyol substantially as described in Example II of U.S. Serial No. 878,594. Examples 9-18 prepared using a graft polyol comprising the reaction of acrylonitrile in a propylene oxide adduct of glycerine, sold by Union Carbide under the name NIAX® 31–45; [8] 1,1,2-trifluoro-1,2,2-trichloroethane.

From the above table, it is seen that the acrylonitrile-graft polyol has a drastic effect on the friability of the foams. For instance, the control foams of Examples 1, 9, 14 and 17 were more friable in comparison to their analogous foams prepared with varying amounts of the polyol.

EXAMPLE XIX

This example establishes that there is no impairment of the excellent flame retardancy properties of the instant foams when an acrylonitrile-graft polyol is incorporated into the foams.

The foams of Examples 1–18 were flame tested in accordance with the Butler Chimney Test as described by Krueger et al., SPE 25th Antec., vol. XIII, Detroit, Mich., 1967, pp. 1052–1057. The results of this test are set forth below in Table II.

TABLE II

| Ex. foam | Percent weight retention | Flame height, in inches[1] | Smoke |
|---|---|---|---|
| 1 | 96 | C– | Light. |
| 2 | 95 | C– | Do. |
| 3 | 97 | B | Do. |
| 4 | 95 | C– | Do. |
| 5 | 94 | C– | Do. |
| 6 | 96 | B | Do. |
| 7 | 96 | B | Do. |
| 8 | 97 | B | Do. |
| 9 | 97 | B | None. |
| 10 | 97 | B | Do. |
| 11 | 97 | B | Do. |
| 12 | 96 | B | Do. |
| 13 | 95 | B | Do. |
| 14 | 97 | B | Do. |
| 15 | 96 | B | Do. |
| 16 | 97 | B | Do. |
| 17 | 98 | A | Do. |
| 18 | 97 | B | Do. |

[1] Flame Height Code: A=0–2″ flame height; B=2–5″ flame height; C–=5–7″ flame height; C+=7–10″ flame height; D=10″ and above flame height.

It can be seen from the above that there is no impairment of the flame retardancy, weight retention and low smoke characteristics of the carbodiimide foams with the inclusion of the graft polyol.

We claim:
1. A rigid cellular foam characterized by carbodiimide linkages prepared by the catalytic condensation of an organic polyisocyanate in the presence of (a) a blowing agent and (b) a friability-inhibiting amount of an acrylonitrile-grafted polyol.
2. The foam of claim 1 wherein the graft polyol is employed in an amount ranging from about 1 to 20 parts by weight thereof per 100 parts by weight of organic polyisocyanate.
3. The foam of claim 1 wherein the acrylonitrile-grafted polyol comprises the in situ, free-radical initiated polymerization product of acrylonitrile in a reactive polyol medium.
4. The foam of claim 3 wherein the acrylonitrile-grafted polyol has a molecular weight of at least about 1500 and a viscosity of less than 40,000 cps. at 10% polymer concentration.
5. The foam of claim 3 wherein the acrylonitrile-grafted polyol is prepared by grafting acrylonitrile onto a propylene oxide adduct of glycerine, the polyol having a molecular weight of about 3,700, a hydroxl number of from 43 to 47 and containing from about 17% to 18% by weight of acrylonitrile.
6. The foam of claim 1 wherein the organic polyisocyanate is toluene diisocyanate, methylene diphenyl diisocyanate or mixtures thereof.

References Cited
UNITED STATES PATENTS

| | | |
|---|---|---|
| 3,383,351 | 5/1968 | Stamberger. |
| 3,605,848 | 9/1971 | Lombardi et al. __ 260—2.5 BF |
| 3,657,161 | 4/1972 | Bernard et al. ____ 260—2.5 BF |
| 3,580,868 | 5/1971 | Diehr et al. _____ 260—2.5 AC |
| 3,620,986 | 11/1971 | Diehr et al. _____ 260—2.5 AC |

DONALD E. CZAJA, Primary Examiner

H. S. COCKERAM, Assistant Examiner

U.S. Cl. X.R.

260—2.5 AM, 77.5 CR, 77.5 AP, 859